United States Patent
Ryan et al.

(10) Patent No.: US 8,370,683 B1
(45) Date of Patent: Feb. 5, 2013

(54) SYSTEM AND METHOD TO REDUCE WRITE SPLICE FAILURES

(75) Inventors: Robert P. Ryan, Mission Viejo, CA (US); Robert M. Fallone, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 174 days.

(21) Appl. No.: 12/533,993

(22) Filed: Jul. 31, 2009

(51) Int. Cl.
*G06F 11/00* (2006.01)

(52) U.S. Cl. .......................... 714/14; 714/6.1

(58) Field of Classification Search ............ 714/6.1, 714/6.11, 6.12, 6.13, 6.2, 6.23, 6.24, 6.3, 714/14, 22, 36, 10–12
See application file for complete search history.

(56) References Cited

U.S. PATENT DOCUMENTS

| | | | |
|---|---|---|---|
| 5,047,988 A | 9/1991 | Mizuta | |
| 5,414,861 A | 5/1995 | Horning | |
| 5,438,549 A | 8/1995 | Levy | |
| 5,448,719 A * | 9/1995 | Schultz et al. | 714/5.11 |
| 5,586,291 A | 12/1996 | Lasker et al. | |
| 5,596,532 A | 1/1997 | Cernea et al. | |
| 5,693,570 A | 12/1997 | Cernea et al. | |
| 5,706,239 A | 1/1998 | Brys | |
| 5,724,501 A * | 3/1998 | Dewey et al. | 714/5.11 |
| 5,798,961 A | 8/1998 | Heyden et al. | |
| 6,189,107 B1 | 2/2001 | Kim et al. | |
| 6,295,577 B1 | 9/2001 | Anderson et al. | |
| 6,516,426 B1 | 2/2003 | Forehand et al. | |
| 6,760,672 B2 | 7/2004 | Floro et al. | |
| 6,798,599 B2 | 9/2004 | Dykes et al. | |
| 6,856,556 B1 | 2/2005 | Hajeck | |
| 7,003,620 B2 * | 2/2006 | Avraham et al. | 711/103 |
| 7,051,306 B2 | 5/2006 | Hoberman et al. | |
| 7,100,080 B2 * | 8/2006 | Howe | 714/24 |
| 7,126,857 B2 | 10/2006 | Hajeck | |
| 7,363,542 B2 * | 4/2008 | Motegi | 714/24 |
| 7,392,429 B2 * | 6/2008 | Frank et al. | 714/24 |
| 7,415,680 B2 | 8/2008 | Hoberman et al. | |
| 2006/0107077 A1 | 5/2006 | Roth et al. | |
| 2007/0094446 A1 * | 4/2007 | Sone et al. | 711/113 |
| 2010/0202238 A1 * | 8/2010 | Moshayedi et al. | 365/228 |

* cited by examiner

*Primary Examiner* — Scott Baderman
*Assistant Examiner* — Joseph Kudirka

(57) ABSTRACT

Systems and methods are provided for reducing write splice failures. In one embodiment, a system for writing data to a media includes a write buffer for storing a data sector and a backup power device for providing power to the write buffer in the event of a power failure to hold the data sector in the write buffer. The next time the system is powered up after the power failure, the system reads the data sector from the write buffer and uses the read data sector to correct a write splice on the media that may have occurred due to the power failure.

30 Claims, 8 Drawing Sheets

US 8,370,683 B1

SYSTEM AND METHOD TO REDUCE WRITE SPLICE FAILURES

BACKGROUND OF THE INVENTION

In a disk drive, data sectors may be written to a disk in which each data sector is temporarily stored in a write buffer and then written from the write buffer to the disk by a write head. When a power failure occurs in the disk drive, the current data sector in the write buffer may be lost while a write operation is in progress. As a result, a write splice failure may occur in which only a portion of the current data sector is written to the disk before the power failure.

The write splice failure results in a mixed data sector on the disk that includes a portion of the current data sector and a portion of an old data sector previously written to the disk. The write splice may lead to a read failure when the mixed data sector is subsequently read from the disk. As a result of the read failure, various drive quality checkers may declare the disk drive bad.

Accordingly, there is a need for reducing write splice failures.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of embodiments of the present invention. It will be apparent, however, to one ordinarily skilled in the art that the present invention may be practiced without some of these specific details. In other instances, well-known structures and techniques have not been shown in detail to avoid unnecessarily obscuring the present invention.

Embodiments of the present invention may be used with many types of storage devices including disk drives, solid state drives, optical drives (e.g., CD drive) and other types of storage devices.

Figure 1:
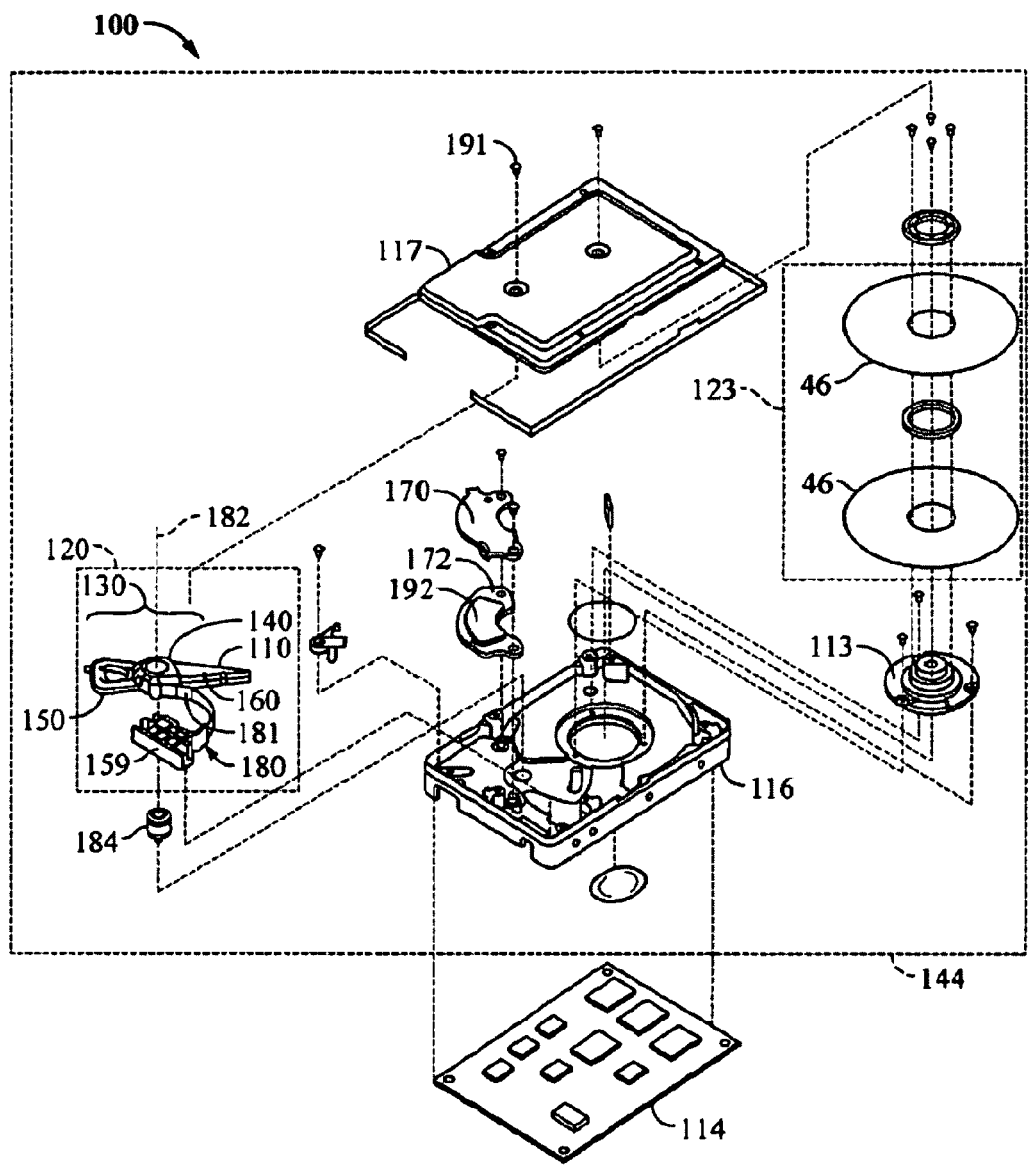
FIG. 1 is a perspective, exploded view of an example of a disk drive.

FIG. 1 is a perspective view illustrating the principal mechanical components of an embodiment of a disk drive 100. The disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks (e.g. disks 46), a spindle motor 113 attached to the base 116 for rotating the disk stack 123, a head stack assembly (HSA) 120, and a pivot bearing cartridge 184 that rotatably supports the HSA 120 on the base 116. The spindle motor 113 typically rotates the disk stack 123 at a relatively constant angular velocity. In one embodiment, spindle motor 113 may be a three-phase motor comprising three separate coil windings.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a VCM coil 150 cantilevered from the body portion 140 in an opposite direction from the actuator arm 160. The actuator arm 160 supports the HGA 110 that, in turn, supports the head(s). The flex cable assembly 180 may include a flex circuit cable and a flex clamp 159. Further, flex cable assembly 180 may include a temperature sensor 181 mounted to or within the flex circuit cable. Alternatively, a temperature sensor may be mounted on the PCBA 114 facing the HDA 144 surface.

The HSA 120 is pivotally secured to the base 116 via the pivot-bearing cartridge 184 so that the head at the distal end of the HGA 110 may be moved over the surfaces of the disks 46. The pivot-bearing cartridge 184 enables the HSA 120 to pivot about a pivot axis, shown in FIG. 1 at reference numeral 182.

The "rotary" or "swing-type" actuator assembly comprises body portion 140 that rotates on the pivot bearing 184 cartridge between limited positions, VCM coil 150 that extends from body portion 140 to interact with one or more permanent magnets 192 mounted to back irons 170, 172 to form the voice coil motor (VCM), and actuator arm 160 that supports HGA 110. The VCM causes the HSA 120 to pivot about the actuator pivot axis 182 to cause the read/write heads or transducers thereof to sweep radially over the disk(s) 46.

Figure 2:
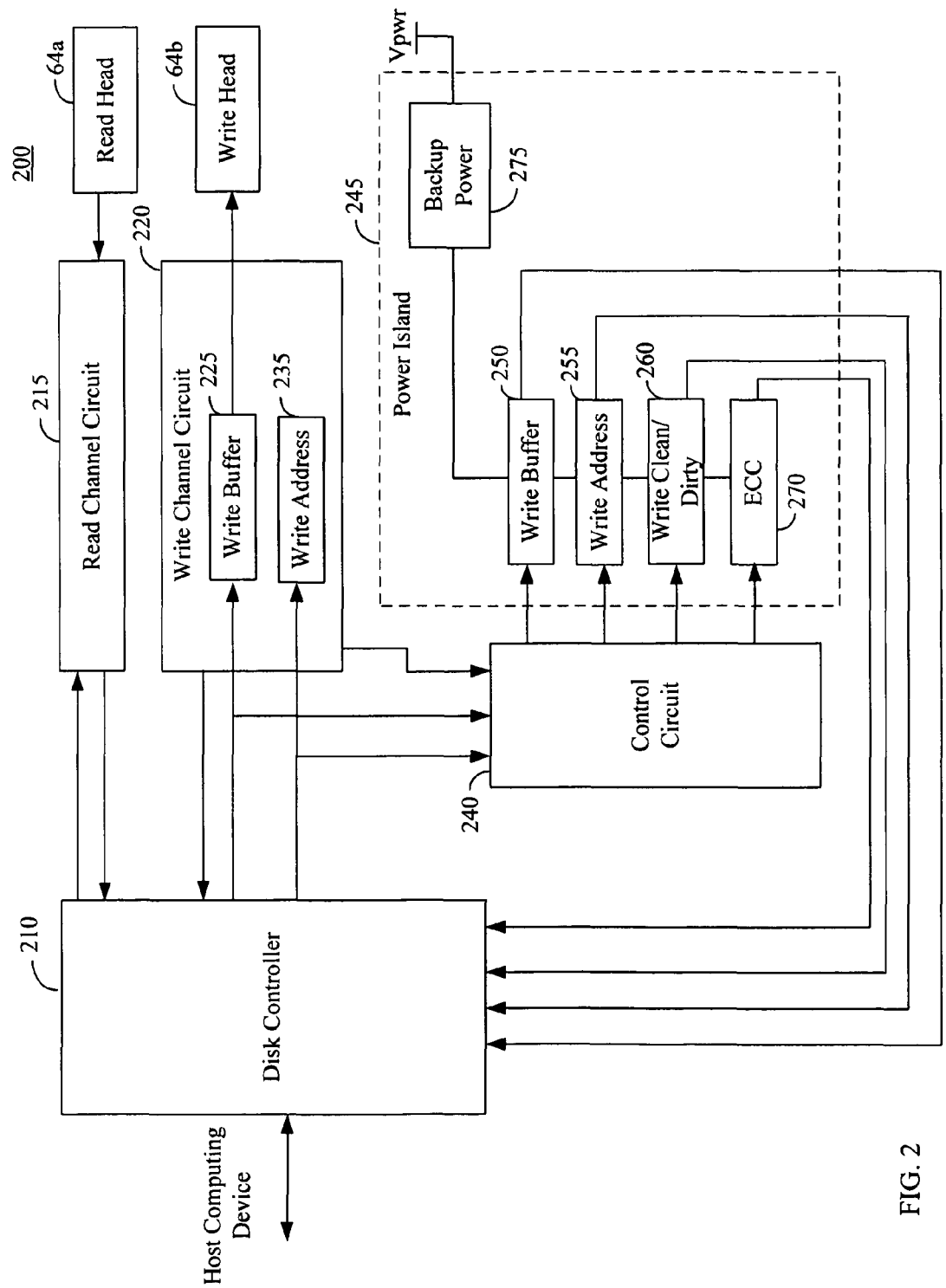
FIG. 2 is a block diagram illustrating a disk drive system according to an embodiment of the invention.

FIG. 2 is a block diagram illustrating a disk drive system 200 according to an embodiment of the present invention. The system 200 includes a disk controller 210, a read channel circuit 215, a write channel circuit 220, one or more read heads 64a and one or more write heads 64b. The disk drive system 200 may include a read head 64a and a write read 64b for each surface of a disk 46 of the disk drive 100. The disk controller 210 controls various operations of the disk drive system 200, as discussed further below. The read channel circuit 215 reads data from the disk(s) 46 using the read head 64a and sends the read data to the disk controller 210. The write channel circuit 220 receives data from the disk controller 210 and writes the data to the disk(s) 46 using one or more write heads 64b. The disk controller 210, the read channel circuit 215 and the write channel circuit 220 may be mounted on the PCBA 114 shown in FIG. 1.

In one embodiment, the disk controller 210 receives data to be written to the disk(s) 46 from a host computing device. The host computing device may be a desktop computer, a laptop computer, a mobile computing device, or any type of computing device utilizing a disk drive. In this embodiment, the disk controller 210 may temporarily store the received data in cache memory, which may comprise a random access memory (RAM).

To write the data to the disk(s) 46, the disk controller 210 reads the data from the cache memory and sends the data in sectors to the write channel circuit 220. For each data sector, the disk controller 210 may also send a write address identifying an address on the disk(s) 46 at which the data sector is to be written. The write address may include a track and sector ID identifying a track and sector on the disk(s) 46. The disk controller 210 also controls the spindle motor 113 to rotate the disk(s) 46 and controls the VCM coil 150 to move the actuator arms 160 to position the write head 64b over a desired track on the disk(s) 46. The disk controller 210 may also generate and add error correcting code (ECC) to each data sector before sending the data sector to the write channel circuit 220. The ECC allows the disk controller 210 to later detect and correct errors in the data sector when the data sector is subsequently read from the disk(s) 46. The ECC may also be used to indicate whether the corresponding data sector is valid. If the data sector is error free or has errors that can be corrected by the ECC, then the data sector may be deemed valid. If the data sector has errors and the ECC fails to correct the errors, then the data sector may be deemed invalid.

The write channel circuit 220 includes a write data buffer 225 and a write address buffer 235 for temporarily storing a data sector and the corresponding write address, respectively, received from the disk controller 210. In one embodiment, the write data buffer 225 comprises high-speed volatile memory (e.g., static random access memory (SRAM)) to support fast disk write operations.

The write channel circuit 220 may receive the sector data from the disk controller 210 serially or in parallel. For example, the write channel circuit 220 may receive the sector data over a parallel bus, in which multiple bits of the data sector are received at a time depending on the width of the parallel bus. For example, the parallel bus may have a width of 16 bits or other widths.

The write channel circuit 220 sends the sector data from the write buffer 225 to the write head 64b when the write head 64b is positioned over a location of the disk(s) 46 corresponding to the write address. The write head 64b then magnetically writes the sector data to the disk(s) 46. When the write channel circuit 220 completes sending the data sector from the write buffer 225 to the write head 64b, the write channel circuit 220 may send a signal to the disk controller 210 indicating that the data sector has been successfully written to the disk(s) 46 and that the write channel circuit 220 is ready to receive a next data sector to be written to the disk(s) 46.

To read a data sector from the disk(s) 46, the disk controller 210 may send a read address (e.g., track and sector ID) of the data sector to the read channel circuit 215. The disk controller 210 also controls the spindle motor 113 to rotate the disk(s) 46 and controls VCM coil 150 to move the actuator arms 160 to position the read head 64a over the desired track of the disk(s) 46. The read channel circuit 215 then reads the data sector from the disk(s) 46 using the read head 64a when the read head 64a is positioned over a location of the disk(s) 46 corresponding to the read address. The read channel circuit 215 then sends the read data sector to the disk controller 210. Upon receiving the read sector data, the disk controller 215 may check the ECC of the sector data to detect and correct errors in the read sector data. If the data sector is read in response to a read request from the host computing device, then the disk controller 210 sends the read data sector to the host computing device.

To reduce write splice failures, the disk drive system 200 also includes a control circuit 240, a second write data buffer 250, a second write address buffer 255, a write clean/dirty buffer 260, an ECC buffer 270, and a backup power device 275 that provides power to the buffers 250, 255, 260 and 270. The backup power device 275 is configured to continue to provide power to the buffers 250, 255, 260 and 270 when there is a power failure of the system 200, as discussed further below. The portion of the system 200 that receives power from the backup power device 275 may be referred to as a power island 245. As shown in FIG. 2, the buffers 250, 255, 260 and 270 are located within the power island 245.

In one embodiment, the write channel circuit 220, the read channel circuit 215, and the disk controller 210 receive power from a common power supply. When there is a failure of the power supply (e.g., during a write operation), the backup power device 275 continues to provide power to the buffers 250, 255, 260 and 270 within the power island 245 to hold the contents of the buffers 250, 255, 260 and 270. The backup power device 275 may do this by storing energy from the power supply when the power supply is running and using the stored energy to provide power to the buffers 250, 255, 260 and 270 when the power supply fails. The backup power device 275 may store the energy using one or more capacitors, a battery, or other suitable energy storage devices.

Figure 3:
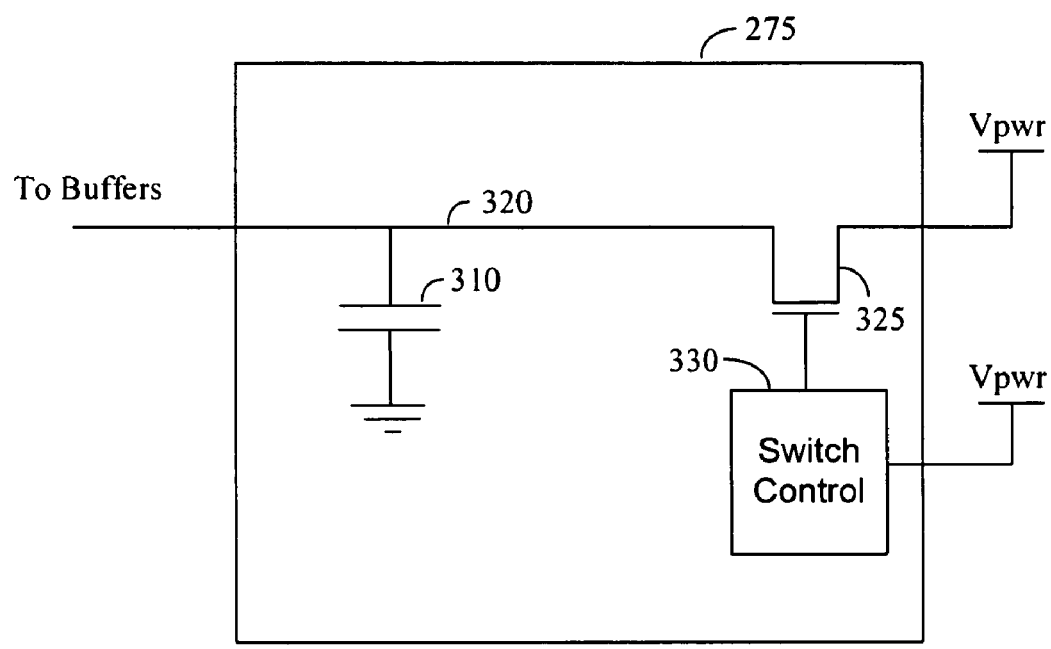
FIG. 3 is a block diagram illustrating a backup power device according to an embodiment of the invention.

FIG. 3 is a block diagram of an example backup power device 275 according to an embodiment of the invention. The backup power device 275 comprises one or more capacitors 310 coupled to a power line 320, a switch 325 and a switch control 330. The power line 320 provides power to the buffers 250, 255, 260 and 270. The switch 325 couples or decouples a power supply voltage Vpwr to the power line 320 and the capacitor(s) 310 depending on whether there is a power failure of the system 200, as discussed further below. The power supply voltage Vpwr may be from the same power supply that provides power to the write channel circuit 220, the read channel circuit 210, and the disk controller 215. The switch 325 may be implemented with a Field Effect Transistor (FET) or other switching devices.

In one embodiment, the switch control 330 is configured to close the switch 325 when the power supply voltage Vpwr is above a threshold level and to open the switch 325 when the power supply voltage Vpwr falls below the threshold level due to a power failure. When the switch 325 is closed, the switch 325 couples the power line 320 to the power supply voltage Vpwr to provide power to the buffers 250, 255, 260 and 270. The switch 325 also couples the capacitor(s) 310 to the power supply voltage Vpwr to charge up the capacitor(s) 310. Assuming a small voltage drop across the switch 325, the capacitor(s) 325 is charged to a voltage approximately equal to the power supply voltage Vpwr. When the switch 325 is opened in the event of a power failure, the switch 325 decouples the power line 320 and the capacitor(s) 310 from the power supply voltage Vpwr. The charge stored on the capacitor(s) 310 maintains a voltage on the power line 320 sufficient to hold the contents of the buffers 250, 255, 260 and 270 for an extended period of time after the power failure. In some embodiments, the extended period of time may be hours, days or weeks.

The backup power device 275 may include a rechargeable battery or other energy storage device coupled to the power line 320 instead of or in addition to the capacitor(s) 310. Also, the backup power device 275 may include a diode between the power line 320 and the power supply voltage Vpwr instead of the switch 325. In this embodiment, the diode allows current flow in a direction from the power supply voltage Vpwr to the power line 320 while blocking current in the opposite direction. This prevents the capacitor(s) 310 from discharging when the power supply voltage drops Vpwr below the voltage of the capacitor(s) 310 due to a power failure.

Referring back to FIG. 2, in one embodiment, the control circuit 240 is configured to write a duplicate copy of the data sector in the write data buffer 225 of the write channel circuit 220 to the second write data buffer 250 during a write operation. The control circuit 240 may receive the data sector from the same output of the disk controller 210 as the write channel circuit 220, as shown in the example in FIG. 2. In this embodiment, the second write data buffer 250 may comprise volatile memory (e.g., static random access memory (SRAM)) that can be written to and read from at high data rates. This enables the control circuit 240 to minor the current contents of the write data buffer 225 in the second write data buffer 250 as the write data buffer 220 receives new data sectors and overwrites old data sectors that have already been written to the disk(s) 46. For example, the control circuit 240 may write the duplicate data sector to the second write data buffer 250 at a data rate of 10 Megabytes/seconds or higher. The control circuit 240 may write a data sector to the second write data buffer 250 serially or in parallel.

The control circuit 240 also writes a duplicate copy of the write address in the write address buffer 235 of the write channel circuit 220 into the second write address buffer 255. The write address may include a track and sector ID identifying a track and sector on the disk(s) 46. The write address may also include a servo wedge number. The control circuit 240 may receive the write address from the same output of the disk controller 210 as the write channel circuit 220.

The control circuit 240 also stores a flag in the write clean/dirty buffer 260 indicating whether the current data sector in the write buffer 225 has been completely written to the disk(s) 46. The flag is set to clean when the data sector in the write data buffer 225 has been completely written to the disk(s) 46 and is set to dirty when the data sector has not been completely written to the disk(s) 46 (i.e., the data sector write to the disk(s) 46 is in progress). The control circuit 240 may determine when the data sector has been completely written to the disk(s) 46 by receiving a signal from the write channel circuit 220 or other circuitry (e.g., servo circuitry) indicating that the data sector has been successfully written to the disk(s) 46. In this embodiment, the control circuit 240 may set the flag in the write clean/dirty buffer 260 to dirty when a data sector is first written to the write data buffer 225. The control circuit 240 may then set the flag in the clean/dirty buffer 260 to clean when the control circuit 240 receives a signal from the write channel circuit 220 indicating that the data sector has been successfully written to the disk(s) 46.

The control circuit 240 may also generate ECC code for the write address and the flag and store the ECC in the ECC buffer 270. As discussed below, the ECC is used to determine whether the write address and the flag in the second write address buffer 255 and the write clean/dirty buffer 260, respectively, are valid.

Although the buffers 250, 255, 260 and 270 are shown separately in FIG. 2 for ease of illustration, they may be implemented in one physical buffer with different portions of the buffer allocated for the data sector, the write address, the flag and the ECC.

As discussed above, the backup power device 275 continues to provide power to the buffers 250, 255, 260 and 270 when there is a power failure of the system 200 to hold the contents of the buffers 250, 255, 260 and 270. The backup power device 275 may provide power to the buffers 250, 255, 260 and 270 for an extended period of time after a power failure. This allows the second write data buffer 225 to hold the duplicate data sector for an extended period of time after the corresponding data sector in the write data buffer 225 is lost due to a power failure during a write operation. The next time the system 200 is powered up after the power failure, the disk controller 210 uses the duplicate data sector in the second write data buffer 250 to detect and correct a write splice failure that may have occurred due to the power failure, as discussed below.

Figure 4:
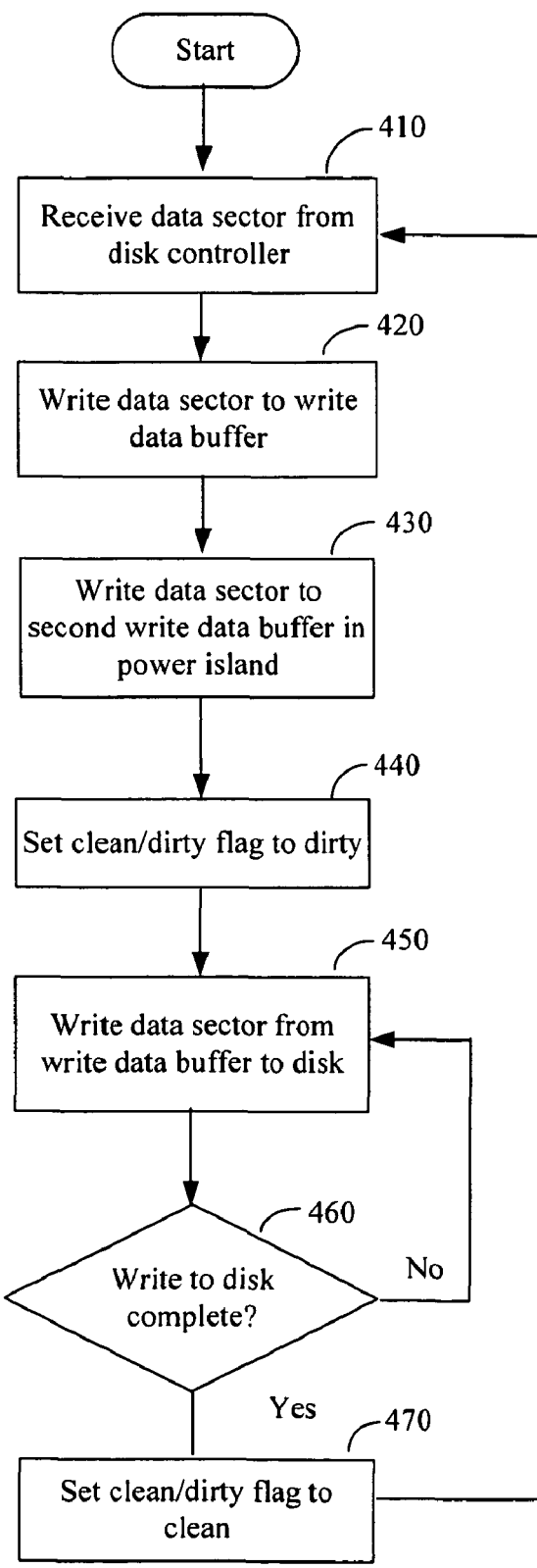
FIG. 4 is a flowchart illustrating a method for mirroring the contents of a write channel in a power island according to an embodiment of the invention.

FIG. 4 is a flowchart illustrating a method for mirroring the current contents of the write data buffer 225 in the second write data buffer 255 in the power island 275 according to an embodiment of the invention. The method may be performed by the write channel circuit 220 and the control circuit 240.

In step 410, the write channel circuit 220 and the control circuit 240 receive a data sector from the disk controller 210. In step 420, the write channel circuit 220 writes the data sector to the write data buffer 225. In step 430, the control circuit 240 writes the data sector to the second write data buffer 250 in the power island 245. Steps 420 and 430 may be performed in parallel. As a result, the second write data buffer 250 stores a duplicate of the data sector in the write data buffer 225. In addition, the control circuit 240 may write a duplicate of the write address in the write address buffer 235 into the second write address buffer 255.

In step 440, the control circuit 240 sets the flag in the write clean/dirty buffer 260 to dirty to indicate that the data sector in the write data buffer 225 has not been completely written to the disk(s) 46 (i.e., the data sector write to the disk(s) 46 is in progress). In step 450, the write channel circuit 220 writes the data sector from the write data buffer 225 to the disk(s) 46 using the write head 64b. In step 460, the write channel circuit 220 determines whether the data sector in the write data buffer 225 is completely written to the disk(s) 46. If the data sector is not completely written to the disk(s) 46, then the write channel circuit 220 continues writing the data sector from the write data buffer 225 to the disk(s) 46 in step 450. If the data sector is completely written to the disk(s) 46, then the write channel circuit 220 sends a signal to the control circuit 240 indicating that the data sector has been successfully written to the disk(s) 46.

In step 470, the control circuit 240 sets the flag in the write clean/dirty buffer 260 to clean to indicate that the data sector in the write data buffer 225 has been completely written to the disk(s) 46. After step 470, the method may return to step 410 to repeat steps 410 through 470 for a next data sector from the disk controller 210 to written to the disk(s) 46.

The control circuit 240 may also generate ECC for the write address and the flag in the second write address buffer 255 and the write clean/dirty buffer 260, respectively, and store the ECC in the ECC buffer 270. As discussed below, the ECC may be used to determine whether the write address and the flag are valid.

When there is a power failure of the system 200, the backup power device 275 provides power to the buffers 250, 255, 260 and 270 to hold the contents of the buffers 250, 255, 260 and 270 for an extended period of time. After the power failure, the state of the flag in the write clean/dirty buffer 260 indicates whether the data sector that was in the write data buffer 225 at the time of the power failure was completely written to the disk(s) 46 before the power failure. A dirty flag indicates that the data sector was not completely written to the disk(s) 46 before the power failure while a clean flag indicates that the data sector was completely written to the disk(s) before the power failure. If the data sector was not written to the disk(s) before the power failure resulting in a write splice, then the disk controller 210 may use the duplicate data sector stored in the second write data buffer 250 to correct the write splice, as discussed below.

Figure 5:
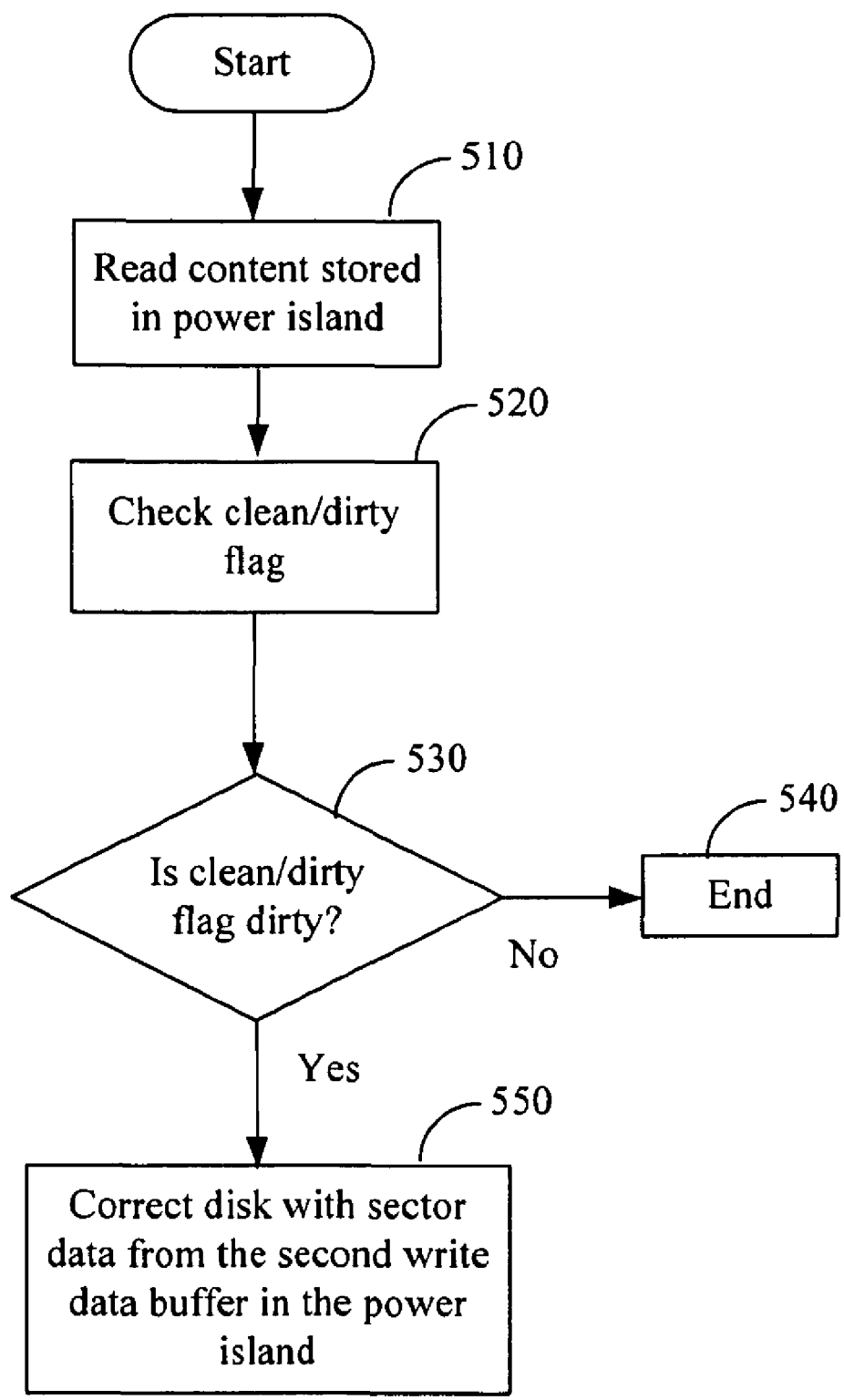
FIG. 5 is a flowchart illustrating a method for correcting a write splice according to embodiment of the invention.

FIG. 5 is a flowchart illustrating a method for correcting a write splice on the disk(s). The method may be performed the next time the system 200 is powered up after a power failure and may be performed by the disk controller 210, the write channel circuit 220 and the control circuit 240.

In step 510, the disk controller 210 reads the contents of the buffers 250, 255, 260 and 270 in the power island 275. In step 520, the disk controller 210 checks the flag from the write clean/dirty buffer 260 to determine whether the data sector that was in the write data buffer 225 at the time of a power failure was completely written to the disk(s) 46 before the power failure. The disk controller 210 may also check the ECC from the ECC buffer 270 to determine whether the write address and the flag from the second write address buffer 255 and the write clean/dirty buffer 260, respectively, are valid. If the write address and flag are invalid, then the method ends.

In step 530, the disk controller 210 determines whether the flag from the write clean/dirty buffer 260 is dirty. If the flag is not dirty (i.e., clean), then the method ends in step 540. If the flag is dirty, then the disk controller 210 corrects the disk(s) with the data sector from the second write data buffer 250 in step 550. The disk controller 210 may do this by sending the data sector and the write address from the second write data buffer 250 and the second write address buffer 255, respectively, to the write channel circuit 220 to write the data sector to the disk(s) 46 at the address on the disk(s) 46 specified by the write address. Thus, when a write splice occurs on the disk(s) 46 due to a power failure during a write operation, the disk controller 210 corrects the write splice using the data sector from the second write data buffer 250 in the power island 245.

Before correcting the disk(s) 46 in step 550, the disk controller 210 may verify whether a write splice is present on the disk(s) 46 at the address specified by the write address from the second write buffer 250. In this embodiment, the disk controller 210 may read the data sector from the disk(s) 46 at the address specified by the write address using the read channel circuit 215. The disk controller 210 may then check the ECC in the data sector read from the disk(s) 46 to determine whether a write splice is present. If the ECC in the data sector from the disk(s) 46 indicates that the data sector is invalid, then the disk controller 210 may determine that a write splice is present on the disk(s) 46 and correct the write splice in step 550. If the ECC in the data sector from the disk(s) 46 indicates that the data sector is valid, then the disk controller 210 may determine that a write splice is not present on the disk(s) 46 and skip step 550.

Before correcting the disk(s) 46 in step 550, the disk controller 210 may read the data sector from the disk(s) 46 at the address specified by the write address from the second write buffer 250 and compare the data sector from the disk(s) 46 with the data sector from the second write data buffer 250. If the two data sectors match, then the disk controller 210 may determine that a write splice is not present on the disk(s) 46 and skip step 550. The disk controller 210 may perform the comparison after the two data sectors have been corrected for errors using the respective ECCs.

In one embodiment, the write clean/dirty flag buffer 260 may be omitted. In this embodiment, the disk controller 210 may determine whether a write splice is present on the disk(s) at power up by reading the data sector from the disk(s) 46 at the address specified by the write address from the second write address buffer 255. The disk controller 210 may then compare the data sector read from the disk(s) 46 with the data sector read from the second write data buffer 250. If the two data sectors do not match, then the disk controller 210 may determine that a write splice is present and correct the write splice on the disk(s) 46 using the data sector from the second write data buffer 250 in step 550.

Before correcting the disk(s) 46 in step 550, the disk controller 210 may verify whether the data sector from the second write buffer 250 is valid by checking the ECC in the data sector from the second write data buffer 250. If the ECC indicates that the data sector is valid, then the disk controller 210 may determine that the data sector from the second write buffer 250 is valid and proceed with correcting the disk(s) 46 using the data sector from the second write buffer 250. However, if the ECC in the data sector from second write buffer 250 indicates the data sector is invalid, then the disk controller 210 may skip writing the data sector from the second write buffer 250 to the disk(s) 46 since the data sector is invalid.

The contents of the buffers 250, 255 and 260 may become invalid when the system 200 remains off for a long period of time and the backup power device 275 is unable to provide power for the long period of time. For example, the capacitor(s) 310 in the backup power device 275 may slowly leak charge over time causing the voltage on the power line 320 to eventually fall below a voltage sufficient to hold the contents of the buffers 250, 255, 260 and 270 when the system 200 remains off for too long.

The disk controller 210 may determine whether the voltage on the power line 320 is sufficient to hold the contents of the buffers 250, 255, 260 and 270 by checking the voltage on the power line 320 with a voltage detector just prior to the switch 325 being closed at power up.

Figure 6:
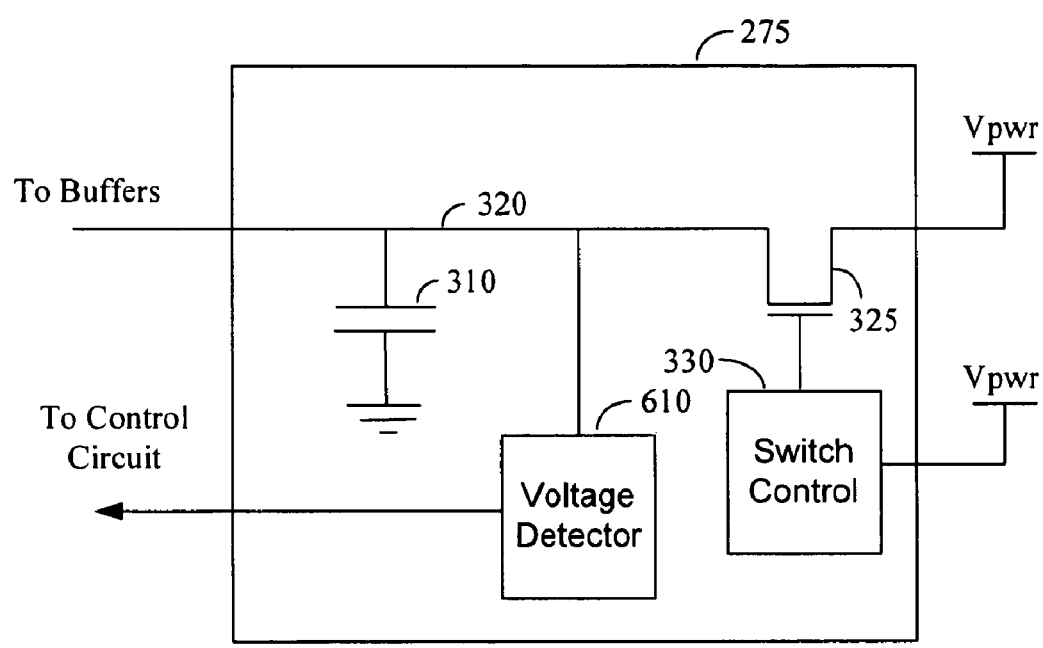
FIG. 6 is a block diagram illustrating a backup power device including a voltage detector according to an embodiment of the invention.

FIG. 6 is a block diagram illustrating the backup power device 275 including a voltage detector 610 coupled to the power line 320 according to an embodiment of the invention. In this embodiment, the control circuit 240 checks the voltage on the power line 320 using the voltage detector 610 just prior to the switch 325 being closed at power up. If the detected voltage is above a predetermined threshold voltage, then the control circuit 240 may send a signal to the disk controller 210 to proceed with reading the contents from the buffers 250, 255, 260 and 270. The threshold voltage may be based on a minimum voltage needed to hold the contents of the buffers 250, 255, 260 and 270.

The disk controller 210 may also determine whether the contents of the buffers 250, 255 and 260 are valid by checking the ECC in the data sector from the second write data buffer 250 and/or checking the ECC of the write address and the flag from the second write buffer 255 and the write clean/dirty buffer 260, respectively.

Therefore, the disk drive system 200 according to various embodiments described above is capable of detecting and correcting a write splice on the disk(s) 46 caused by a power failure.

The disk drive system 200 according to some embodiments described above provide one or more of the following advantages. One advantage is that the disk drive system 200 prevents a write splice from causing a read failure by correcting the write splice when the system 200 is powered up after a power failure. This reduces the likelihood that disk drive will be declared bad because of read failures due to write splices. Another advantage is that the buffers 250, 255, 260 and 270 store a relatively small amount of data, and can therefore be made small and inexpensively. Another advantage is that the buffers 250, 255, 260 and 270 and the control circuit 240 can be integrated with other components of the system 200 on a chip to further reduce cost.

The switch 325, power line 320 and switch control 330 of the backup power deice 275 may also be integrated with other components of the system 200 on a chip. The capacitor(s) 310 of the backup power device 275 may be implemented with an external capacitor that is coupled to the switch 325 on the chip through a pin or other electrical contact on the chip. The backup power device 275 may also be used to provide power to other components of the disk drive system 200.

Figure 7:
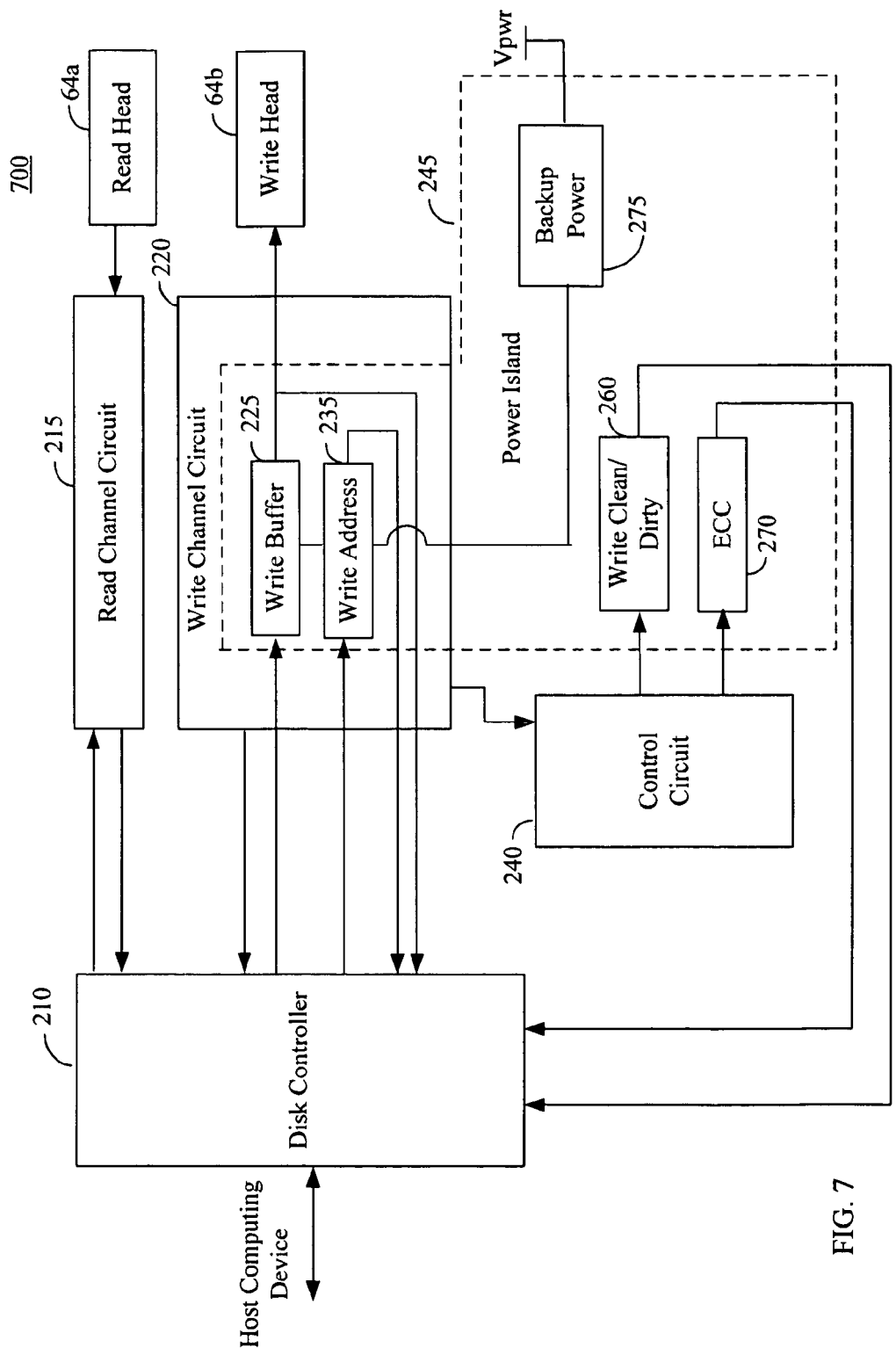
FIG. 7 is a block diagram illustrating a disk drive system according to another embodiment of the invention.

FIG. 7 shows a drive system 700 according an embodiment in which the second write data buffer 250 and the second write address buffer 255 are omitted. In this embodiment, the backup power device 275 is coupled to the write data buffer 225 and the write address buffer 235 of the write channel circuit 220 to hold the contents of the buffers 225 and 235 in the event of a power failure. In addition, read data paths are provided from the buffers 225 and 235 to the disk controller 210 for the disk controller 210 to read the contents of the buffers 225 and 235. When there is a power failure of the system 200, the backup power device 275 continues to provide power to the write data buffer 225 and the write address buffer 235 to hold the data sector and write address, respectively. The next time the system is powered up after the power failure, the disk controller 210 reads the data sector and the write address from the write data buffer 225 and the write address buffer 235, respectively. The disk controller 210 may then use the read sector data and write address to correct a write splice on the disk(s) 46 that may have occurred due to the power failure using any one of the methods discussed above.

Figure 8:
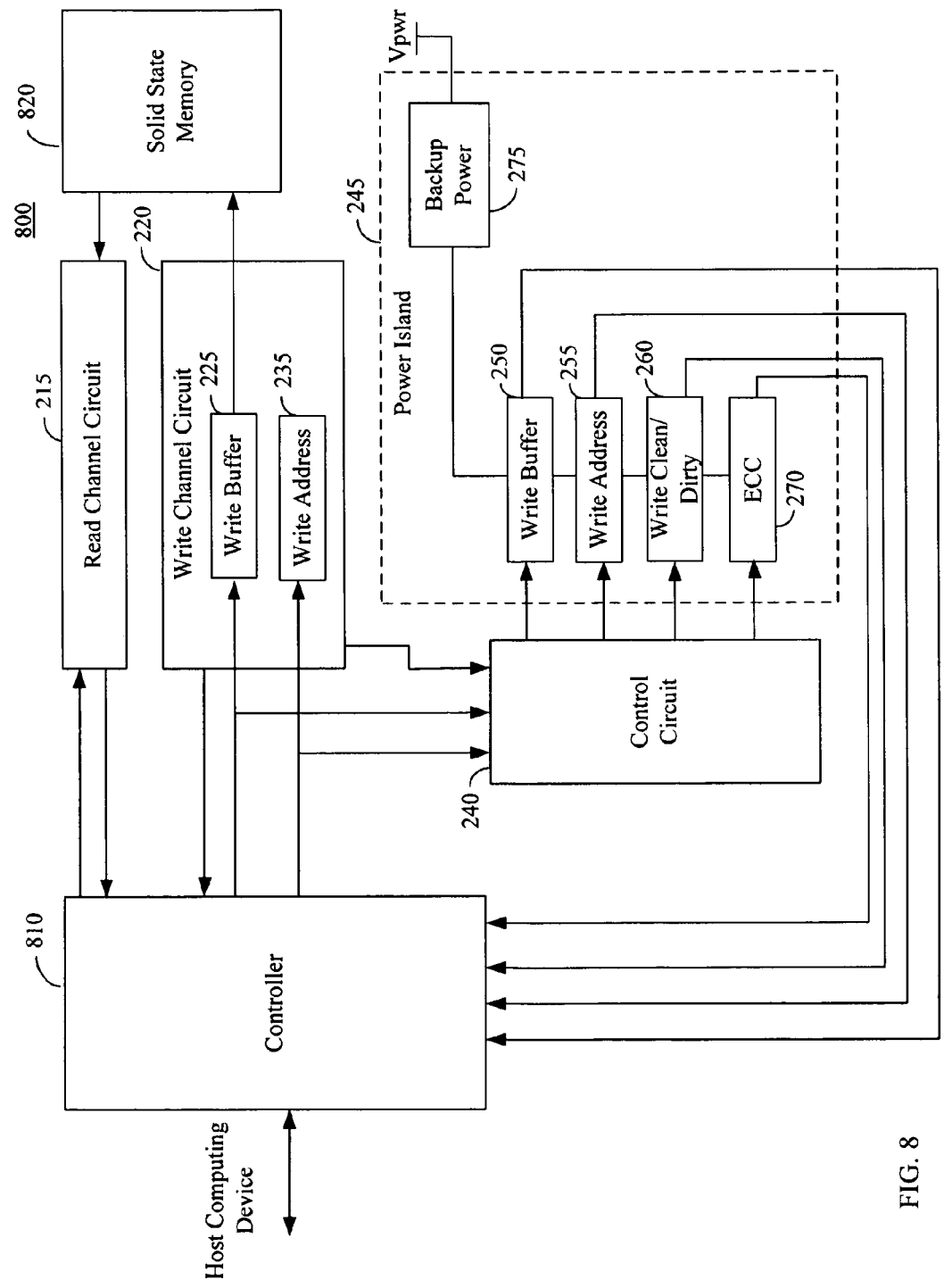
FIG. 8 is a block diagram illustrating a solid state memory system according to an embodiment of the invention.

Embodiments of the invention may also be used to correct write splices for other storage media. For example, embodiments of the invention may be used to correct write splices in a solid state memory (e.g., flash memory). FIG. 8 shows an embodiment of a system 800 for correcting write splices in a solid state memory 820. In this example, a controller 810 sends data to be written to the solid state memory 820 to a write data buffer 225. The data may then be written from the write data buffer 225 to the solid state memory 820. If there is power failure while a write operation is in progress, then the controller 810 may correct a write splice in the solid state memory 820 that may have occurred due to the power failure using any of the methods discussed above. The controller 810, the read channel circuit 215 and/or the write channel circuit 220 may be separate from the solid state memory 820 or integrated with the solid state memory 820 on a single chip.

The disk controller 210 and the control circuit 240 may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The disk controller 210 and the control circuit 240 may also include software code that is stored in a machine-readable medium and executed by a processor to perform the functions described herein.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A system for writing data to a media, comprising:
a first write buffer configured to receive and store sector data to be written to the media based on a system power;
a power island configured to be powered separately by a backup power device when there is a power failure of the system power and comprising a second write buffer, wherein the first and second write buffers each comprise volatile memory, and wherein the first write buffer is not powered by the backup power device when there is a power failure of the system power; and
a control circuit configured to store a duplicate of the sector data in the second write buffer of the power island and notify the power island when writing of the sector data from the first write buffer to the media is complete,
wherein the backup power device is configured to provide power to the power island for the second write buffer to hold the sector data in the second write buffer when there is a power failure of the system power.

2. The system of claim 1, wherein the backup power device comprises:
a capacitor coupled to the second write buffer; and
a switch coupled between the capacitor and a power supply, wherein the switch is configured to open when there is a power failure of the system power.

3. The system of claim 2, further comprising a voltage detector configured to measure a voltage across the capacitor, wherein the control circuit is configured to determine whether the sector data in the second write buffer is valid based on the measured voltage.

4. The system of claim 1, further comprising a third buffer in the power island, wherein the control circuit is configured to store a flag in the third buffer indicating whether the sector data written to the media is complete, and the backup power device is configured to provide power to the third buffer to hold the flag in the third buffer when there is a power failure of the system power.

5. The system of claim 4, further comprising a media controller configured to, upon power up, retrieve the sector data from the second write buffer when the flag indicates that the sector data written to the media is incomplete, and to store the retrieved sector data in the first write buffer for writing of the retrieved sector data to the media to replace the incomplete sector data on the media.

6. The system of claim 1, further comprising a fourth buffer in the power island, wherein the control circuit is configured to store verification data and corresponding error correction code (ECC) in the fourth buffer, and the backup power device is configured to provide power to hold the verification data and corresponding ECC in the fourth buffer when there is a power failure of the system power.

7. The system of claim 6, further comprising a media controller configured to, upon power up, retrieve the verification data and corresponding ECC from the fourth buffer, to determine whether the verification data is valid based on the ECC, to retrieve the sector data from the second write buffer when the verification data is determined valid, and to store the retrieved sector data to the first write buffer for writing of the retrieved sector data to the media.

8. The system of claim 1, further comprising a fifth buffer in the power island, wherein the control circuit is configured to store a write address for the sector data in the fifth buffer, and the backup power device is configured to provide power to the fifth buffer to hold the flag in the fifth buffer when there is a power failure of the system power.

9. The system of claim 8, further comprising a media controller configured to, upon power up, retrieve the sector data from the second write buffer and the write address from the fifth buffer, and to store the retrieved sector data to the first write buffer for writing of the retrieved sector data to the media at a location specified by the write address.

10. The system of claim 1, wherein the media comprises a disk.

11. The system of claim 1, wherein the media comprises a flash memory.

12. A method for writing data to a media, comprising:
storing sector data in a first write buffer based on a system power;
storing a duplicate of the sector data to a second write buffer within a power island configured to be powered by a backup power device when there is power failure of the system power, wherein the first and second write buffers each comprise volatile memory, and wherein the first write buffer is not powered by the backup power device when there is a power failure of the system power;
writing the sector data from the first write buffer to the media;
notifying the power island when writing of the sector data from the first write buffer to the media is complete; and
providing power, by the backup power device, to the power island for the second write buffer to hold the sector data in the second write buffer when there is a power failure of the system power.

13. The method of claim 12, wherein providing power to the second write buffer comprises:
charging, through a switch, a capacitor coupled to the second write buffer; and
opening the switch when there is a power failure of the first write buffer.

14. The method of claim 13, further comprising:
measuring a voltage across the capacitor; and
determining whether the sector data in the second write buffer is valid based on the measured voltage.

15. The method of claim 12, further comprising:
storing a flag in a third buffer in the power island indicating whether the sector data written to the media is complete; and
providing power to the third buffer to hold the flag in the third buffer when there is a power failure of the first write buffer.

16. The method of claim 15, further comprising:
retrieving the sector data from the second write buffer when the flag indicates that the sector data written to the media is incomplete; and
writing the retrieved sector data to the media to replace the incomplete sector data on the media.

17. The method of claim 12, further comprising:
storing verification data and corresponding error correction code (ECC) in a fourth buffer in the power island; and
providing power to the fourth buffer to hold the data and corresponding ECC in the fourth buffer when there is a power failure of the first write buffer.

18. The method of claim 17, further comprising:
retrieving the verification data and corresponding ECC from the fourth buffer;
determining whether the verification data is valid based on the ECC;
retrieving the sector data from the second buffer when the verification data is determined valid; and
writing the retrieved sector data to the media.

19. The method of claim 12, further comprising:
storing a write address for the sector data in a fifth buffer in the power island; and
providing power to the fifth buffer to hold the flag in the fifth buffer when there is a power failure of the first write buffer.

20. The method of claim 19, further comprising:
retrieving the sector data from the second write buffer and the write address from the fifth buffer; and
writing the retrieved sector data to the media at a location specified by the write address.

21. The method of claim 12, wherein the media comprises a disk.

22. The method of claim 12, wherein the media comprises a flash memory.

23. A data storage device comprising:
media for storing data;
a first write buffer configured to receive and store sector data to be written to the media based on a first power signal;
a power island separately powered by a backup power device when there is a failure of the first power signal and comprising a second write buffer, wherein the first and second write buffers each comprise volatile memory, and wherein the first write buffer is not powered by the backup power device when there is a failure of the first power signal; and
a control circuit configured to store a duplicate of the sector data in the second write buffer and notify the power island when writing of the sector data from the first write buffer to the media is complete,
wherein the backup power device is configured to provide power to the power island for the second write buffer to hold the sector data in the second buffer when there is a power failure of the first power signal.

24. The data storage device of claim 23, wherein the backup power device comprises:
a capacitor coupled to the second write buffer; and
a switch coupled between the capacitor and a power supply, wherein the switch is configured to open when there is a power failure of the first power signal.

25. A system for writing data to a media normally powered by a system power, wherein the system comprises a first write buffer that is normally powered by the system power, said system comprising:
a power island separately powered by a backup power device when there is a power failure of the system power and comprising at least a second write buffer, the power island configured to receive and store sector data to be written to the media and configured to receive a notification when writing of data from the first write buffer to the media is complete, wherein the second write buffer comprises volatile memory, and wherein the first write buffer is not powered by the backup power device when there is a failure of the system power, wherein the backup power device is configured to provide power to the power island for the write buffer to hold the sector data in the second write buffer when there is a power failure of the system power.

26. The system of claim 25, further comprising a media controller configured to, upon power up, write the sector data stored in the first write buffer to the media.

27. The system of claim 25, further comprising:
a third buffer in the power island; and
a control circuit configured to store a flag in the third buffer indicating whether the sector data written to the media is complete, wherein the backup power device is configured to provide power to the third buffer to hold the flag in the third buffer when there is a power failure of the system power.

28. The system of claim 27, further comprising a media controller configured to, upon power up, write the sector data stored in the first write buffer to the media when the flag indicates that the sector data written to the media is incomplete.

29. A method for writing data to a media in a system, wherein the system comprises a first write buffer that is powered by a system power, said system comprising:
retrieving sector data from a second write buffer in a power island that is separately powered by a backup power device when there is a power failure of system power and, upon power up of the system, wherein the write buffer comprises volatile memory and stores the sector data from a time the system was previously powered on, and wherein the backup power device does not provide power to the first write buffer when there is a power failure of system power;
determining from a notification stored in the power island that writing of the sector data from the first write buffer to the media is complete; and
writing the retrieved sector data to the media when the writing of the sector data from the first write buffer is incomplete.

30. The method of claim 29, further comprising:
retrieving a flag from a third buffer upon power up of the system, the flag indicating whether a sector data on the media is incomplete; and
writing the retrieved sector data to the media when the retrieved flag indicates that the sector data on the media is incomplete.

* * * * *